No. 609,569.  Patented Aug. 23, 1898.
A. BERCHTOLD.
COOKING VESSEL.
(Application filed Dec. 31, 1897.)
(No Model.)
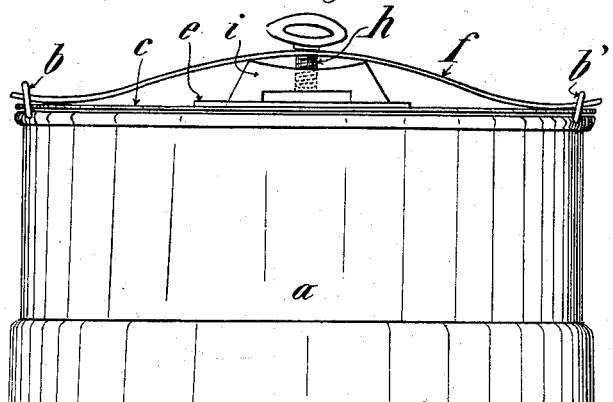
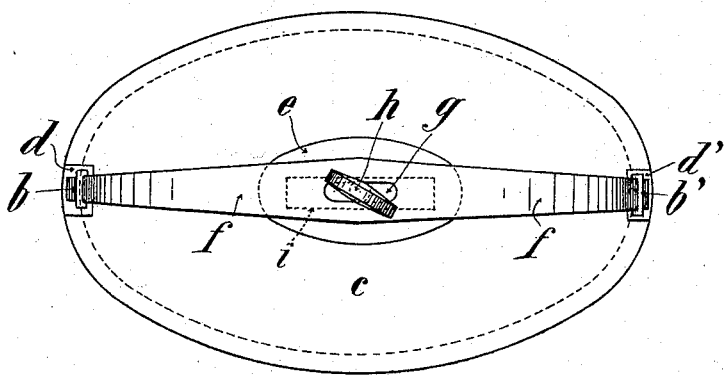
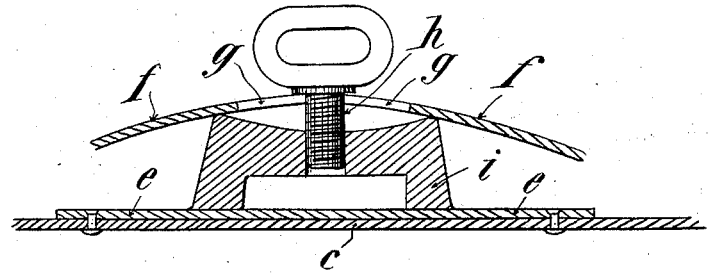
Witnesses
Inventor:
Anton Count Berchtold
by
L. K. Böhm,
Attorney

UNITED STATES PATENT OFFICE.

ANTON BERCHTOLD, OF INNSBRUCK, AUSTRIA-HUNGARY.

COOKING VESSEL.

SPECIFICATION forming part of Letters Patent No. 609,569, dated August 23, 1898.

Application filed December 31, 1897. Serial No. 665,143. (No model.) Patented in Germany February 15, 1896, No. 89,051; in Austria February 28, 1896, No. 46/739, and December 9, 1896, No. 46/4,927; in Italy April 2, 1896, XXXI, 40,890; in France June 2, 1896, No. 254,160; in England June 15, 1896, No. 13,190, and October 7, 1896, No. 22,252; in Belgium October 15, 1896, No. 123,677; in Hungary October 24, 1896, No. 6,351, and in Switzerland April 30, 1897, No. 13,033.

*To all whom it may concern:*

Be it known that I, ANTON BERCHTOLD, a subject of the Emperor of Austria-Hungary, residing at Innsbruck, in the Province of Tyrol, in the Empire of Austria-Hungary, have invented certain new and useful Improvements in Cooking Vessels, (for which I have obtained patents in Austria, No. 46/739, dated February 28, 1896, and No. 46/4,927, dated December 9, 1896; in Hungary, No. 6,351, dated October 24, 1896; in Germany, No. 89,051, dated February 15, 1896; in France, No. 254,160, dated June 2, 1896; in Belgium, No. 123,677, dated October 15, 1896; in Great Britain, No. 22,252, dated October 7, 1896, and No. 13,190, dated June 15, 1896; in Italy, No. XXXI, 40,890, dated April 2, 1896, and in Switzerland, No. 13,033, dated April 30, 1897,) of which the following is a specification.

This invention relates to cooking vessels for military and household purposes and for tourists, the novel feature of the invention being the particular arrangement of the cover and the method of fastening the same to the vessel.

In the accompanying drawings, Figure 1 is an elevation of a cooking vessel made according to my invention. Fig. 2 is a plan of the same, and Fig. 3 is a side elevation of the fastening device for the lid or cover drawn to an enlarged scale.

The cooking vessel consists, essentially, of an oval or round vessel $a$, which has at its upper edge, on two opposite sides, loops $b\ b'$, which, as hereinafter described, are adapted to receive a spring. The upper open end of the vessel is designed to receive an accurately-fitting lid or elastic cover $c$, preferably of iron, steel, or other suitable sheet metal, the said cover having on each side a notch $d$, corresponding with the loops $b\ b'$ on the vessel $a$. These notches $d$ are designed when the cover is placed in position to engage with the loops $b\ b'$ of the vessel $a$, as shown in Figs. 1 and 2. In the center of the cover $c$ a strengthening-plate $e$ is soldered, riveted, or otherwise fixed, the said strengthening-plate being provided with a support or stirrup $i$, which contains in the form as shown in Figs. 1 and 3, the nut for the fastening-screw $h$.

In order to secure the cover, a spring $f$ is provided, which is widest in the middle and gradually grows narrower at the ends. It exerts a force of from four to eight kilograms. The two ends of the spring are inserted in the two loops $b\ b'$, one on each side of the vessel $a$. The spring has at its center a longitudinal slot $g$, through which the fastening-screw $h$ can be passed. As already described, the nut for this screw is formed in the support $i$ of the cover, and by tightening the screw force is exerted on the spring, whereby the lid or cover is slightly lifted off and the steam which is developed in the vessel is allowed to escape.

Having thus described my invention, I claim—

1. A cooking vessel consisting of a vessel $a$ with loops $b$, $b'$ on its upper edge, an elastic cover $c$ with notches $d$ on its sides receiving the loops and provided in its center with a strengthening-plate $e$ having a projecting support $i$ which forms a nut, a flat spring $f$ resting with its center portion on support $i$, engaging with its ends the loops and having a longitudinal slot in its center and a screw $h$ passing through the slot, as specified.

2. In a cooking vessel a fastening and relieving device comprising an elastic cover $c$ with notches $d$ on its sides and provided in its center with a strengthening-plate $e$ having a projecting support $i$ which forms a nut, a flat spring $f$ resting with its center portion on support $i$, and having a slot in its center and a screw $h$ passing through this slot, as specified.

In testimony whereof I have signed this specification in presence of two subscribing witnesses.

ANTON BERCHTOLD.

Witnesses:
HENRY C. CARPENTER,
CHAS. E. CARPENTER.